US007282884B2

(12) United States Patent
Huber et al.

(10) Patent No.: US 7,282,884 B2
(45) Date of Patent: Oct. 16, 2007

(54) PROCEDURE FOR DRIVING A MOVEABLE PART OF AN ITEM OF FURNITURE

(75) Inventors: Edgar Huber, Hard (AT); Uwe Scheffknecht, Höchst (AT)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 11/266,317

(22) Filed: Nov. 4, 2005

(65) Prior Publication Data

US 2006/0261775 A1 Nov. 23, 2006

Related U.S. Application Data

(63) Continuation of application No. PCT/AT2004/000148, filed on May 3, 2004.

(30) Foreign Application Priority Data

May 19, 2003 (AT) .............................. A 763/2003

(51) Int. Cl.
*G05D 15/00* (2006.01)

(52) U.S. Cl. ...................... 318/646; 318/532; 318/640; 312/319.6

(58) Field of Classification Search .................. 318/61, 318/632, 646, 560, 564, 640; 312/348.1, 312/223.6, 319.6; 369/75.2; 720/602, 606; 367/95
See application file for complete search history.

(56) References Cited

U.S. PATENT DOCUMENTS

| | | | | |
|---|---|---|---|---|
| 4,084,149 A * | 4/1978 | Driver et al. | 367/95 |
| 4,719,851 A * | 1/1988 | Chesnut | 100/45 |
| 5,940,306 A * | 8/1999 | Gardner et al. | 700/244 |
| 6,560,183 B2 * | 5/2003 | Takeda | 720/606 |
| 6,643,241 B2 * | 11/2003 | Takeda | 720/602 |
| 6,676,362 B1 * | 1/2004 | Pickering | 414/517 |
| 7,072,261 B2 * | 7/2006 | Cheng et al. | 369/53.25 |
| 2001/0003520 A1 * | 6/2001 | Clark et al. | 369/75.2 |
| 2001/0015947 A1 * | 8/2001 | Takeda | 369/75.2 |
| 2001/0019526 A1 * | 9/2001 | Takeda | 369/75.2 |
| 2002/0171335 A1 * | 11/2002 | Held | 312/223.6 |
| 2003/0122459 A1 * | 7/2003 | Huber et al. | 312/319.6 |
| 2003/0122519 A1 * | 7/2003 | Huber et al. | 318/646 |
| 2003/0223323 A1 * | 12/2003 | Osawa | 369/30.36 |
| 2003/0227661 A1 * | 12/2003 | Cheng et al. | 359/223 |
| 2004/0158845 A1 * | 8/2004 | Iwaasa | 720/605 |
| 2006/0061245 A1 * | 3/2006 | Huber et al. | 312/348.1 |

FOREIGN PATENT DOCUMENTS

| | | |
|---|---|---|
| DE | 197 11 979 A1 | 10/1998 |
| DE | 197 45 597 A1 | 4/1999 |
| DE | 199 44 964 A1 | 3/2001 |
| DE | 101 05 756 A1 | 8/2001 |
| EP | 1 323 363 A1 | 7/2003 |
| GB | 2 374 521 | 10/2002 |
| WO | 01/70165 | 9/2001 |

* cited by examiner

*Primary Examiner*—Paul Ip
(74) *Attorney, Agent, or Firm*—Wenderoth, Lind & Ponack, L.L.P.

(57) ABSTRACT

A method of driving a moveable part and, in particular, a drawer by a drive unit and, in particular, an electric drive unit. At least over a partial length of track ($S_2$), forming part of the total track traversed by the moveable part, the force exerted on the moveable part by the drive unit is controlled at a predetermined level.

13 Claims, 10 Drawing Sheets

*Fig.* 8 a
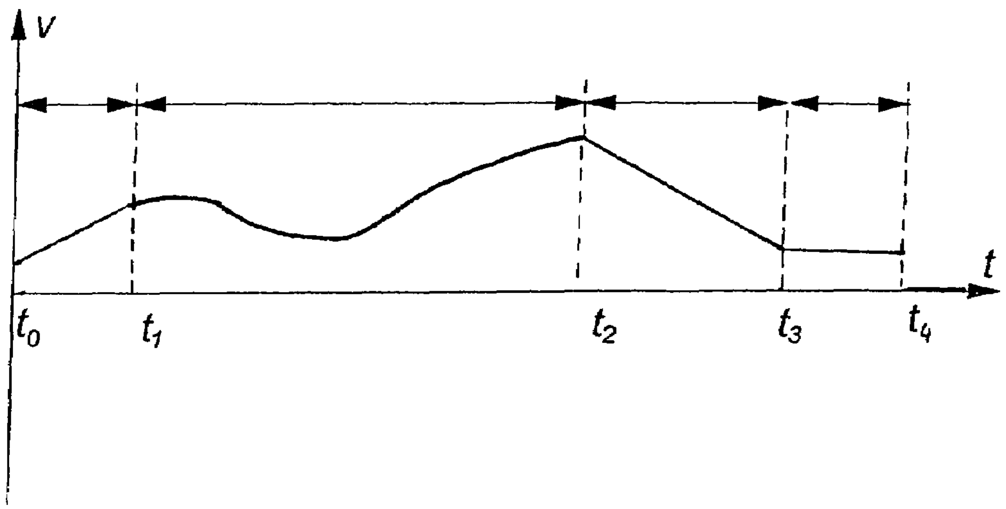
*Fig.* 8 b
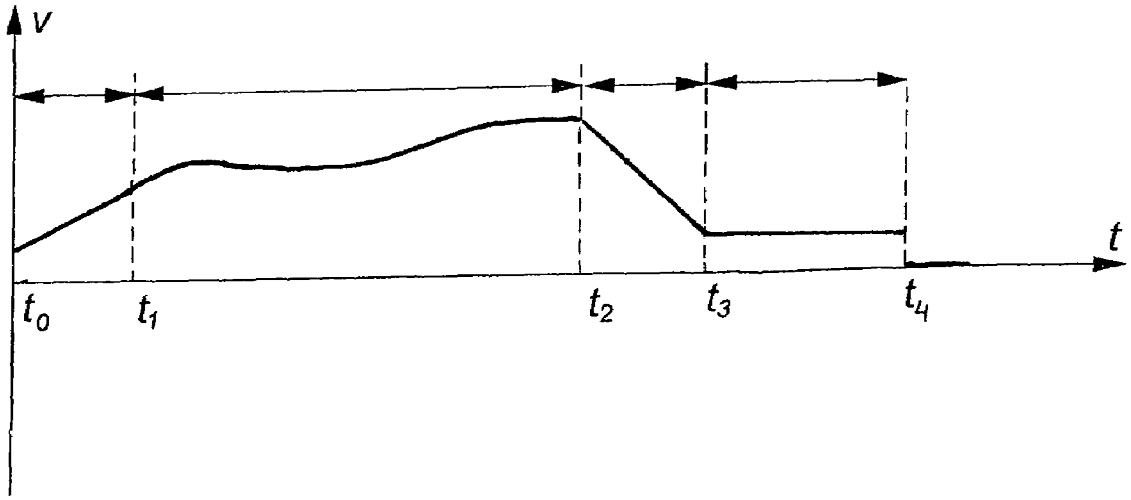

PROCEDURE FOR DRIVING A MOVEABLE PART OF AN ITEM OF FURNITURE

This application is a continuation of International application PCT/AT2004/000148, filed May 3, 2004.

BACKGROUND OF THE INVENTION

1. Technical Field

The present invention relates to a method of driving a moveable part of an item of furniture and, in particular, a drawer, by means of, in particular, an electrically-powered drive unit.

2. Related Art

In the case of moveable parts in an item of furniture, there is a possible risk of injury to the user even when the moveable part of the item of furniture is not moved by a power source. Also, damage to the moveable part can be caused by the movable part colliding with an object in the travel path of the moveable part. Therefore, an attempt was made within the state of the technology to eliminate this danger by using the widest range of safety measures, all of which have the disadvantage that the manufacturing costs of the item of furniture are increased.

SUMMARY OF THE INVENTION

It is the object of the present invention is to provide a procedure for driving a moveable part in a manner which avoids the problems in the prior art.

This is achieved in accordance with the invention by arranging that over at least a portion of the travel path traversed by the moveable part, the force exerted by the drive unit on the moveable part is limited to a predetermined value. In this manner, on the one hand the control system can immediately detect any departure from that level of force caused by a collision between the moveable part and an object. On the other hand distinct from what occurs under the state of the technology when a collision takes place the force does not increase because it is limited to the predetermined value.

Under the state of the technology, powered moveable parts also have the disadvantage that the speed of the moveable parts can only be controlled by the user to a limited extent, if at all, Even when it is possible to select from a choice of predetermined nominal speeds that is achieved in a most unintuitive manner by the activation of switch elements.

Preferably, therefore, the predetermined value of the force is selected in a such a manner that this force just compensates for the resistance to movement of the moveable part, such as, e.g. friction and thereby results in a constant speed of the moveable part. The moveable part thereby appears to be supported in a frictionless manner.

Preferably this is accomplished by overcoming the inertia of the moveable part after the moveable part has been accelerated from a position of rest to a predetermined speed. For example, the drive unit can be RPM-controlled over this partial length of the total length to be traversed by the moveable part. This can relate, for example, to one of the partial lengths of track preceding the open and/or closed end-stop positions and traversed by the moveable part. In this case, therefore, the acceleration and/or the retardation of the moveable part would take place close to the end positions.

On safety grounds, the final speed attained by the moveable part after the initial acceleration phase should be chosen to be such a low value that zero or minimal damage is suffered in the event of a collision taking place.

The final speed attained by the moveable part after the initial acceleration phase is therefore maintained for as long as there is not external intervention by a user or no collision takes place. The user will receive the impression of an undriven moveable part although, in fact, the drive unit still remains active.

By means of this electronic uncoupling of the drive unit there is obtained both a simple operating control of the moveable part and an improvement in the standard of safety. Since the force exerted by the drive unit on the moveable part just compensates the forces opposing the movement of the moveable part, the user can exercise manual input (for example by pushing or pulling) on the moveable part to obtain the speed of movement which is desired. The user is not tied to a predetermined selection but can select any desired speed of movement. Provision is naturally made for a maximal level of selected speed options and also for the selection of selectable speeds to be governed by safety considerations.

Since the speed of the moveable part is freely selectable by the user, he is not exposed to the danger of suffering injury as a result of the speed of the moveable part being too high. It is possible to arrange that the force exerted by the driving device is less than the resistant forces, preferably Null Newton -(N), so that after travelling a certain distance determined by the difference between the driving force and the resistant forces and its mass the moveable part comes to a stop. Any acceleration of the moveable part must then be provided manually by the user.

Naturally, it could also be arranged so that there is no initial acceleration of the moveable part so that the user of the moveable part must move that moveable part through the whole distance using manual force.

It is a common feature of the embodiment examples that as far as the user is concerned no further drive appears to be given to a moveable part after the common initial acceleration phase although the drive unit remains active. The drive unit is, in fact, electronically uncoupled but remains constantly constructively connected to the moveable part, so that in case of need, i.e. a collision, braking can take place immediately.

Even if a collision between the moveable part and an object does occur, the electronic decoupling of the drive unit in accordance with the invention is advantageous compared with simply switching off the drive unit after the initial acceleration phase because the drive unit is immediately available to react to a detected-collision, and here immediately signifies without the time-delay necessitated by switching on the drive unit which is unavoidable under the state of the technology.

In a particularly preferred embodiment of the invention provision is made for regulating the force to the predetermined value by controlling the current fed to the drive unit whereby the strength of the current is determined by the terminal voltage applied to the drive unit. Using this embodiment example, recognition of a collision could be effected in the following manner.

The momentary increase in the strength of the current caused by the collision is detected by the control circuit which then reduces the strength of the current. This is effected by reducing the terminal voltage. If the terminal voltage drops below a predetermined or predeterminable value this is recognized as a collision. Then suitable measures such as, for example, the braking of the moveable part can be undertaken.

Recognition of the collision can also result from, for example, monitoring the speed of the moveable part of measuring the current fed to the drive unit or the voltage. For example, a rise in the current being fed to the drive unit could be detected, which is attributed to the forces developing between the moveable part and the collision object which the drive unit seeks to overcome. Alternatively, a fall in the terminal voltage on the drive unit could be monitored which could be attributed to a sudden drop in the speed of the moveable part causing the voltage to drop.

Yet again there could be monitoring of whether or not the pre-defined positions of the moveable part along its travel path are reached within the pre-set time intervals, although this method has the disadvantage of requiring a very long reaction time. In any case, following a collision between the moveable part and an object suitable measures can be taken such as stopping the movement of the moveable part or a minute reverse movement of the moveable part.

In the case of moveable parts which have different masses such as drawers with different contents the force used to overcome the force restricting the movement of the moveable part can be determined in such a manner that the moveable part travels at a constant speed over a short distance, say 15 mm, thus permitting the necessary force to achieve this to be determined.

If provision is made that the regulation of the force to the predetermined value is accomplished by measurement of the current flow to the drive unit, such that the current strength is established by controlling the terminal voltage to the drive unit, the determination of the current strength required to achieve a constant speed can also be made in such a manner that the moveable part is accelerated to this speed under RPM-control and when that speed has been achieved the current strength at that precise time is measured. While the moveable part is traveling along the next part of the travel path under the influence of a force limited to a predetermined value, current of a strength determined as above is fed to the drive unit controlled by, for example, the input of a suitable terminal voltage.

Provision can also be made for the predetermined value of the force exerted by the drive unit to effect an acceleration of the moveable part. This would be particularly advantageous when the distance to be covered by the moveable part was long since it would shorten the time required for closure. If the resulting acceleration is not too large, the impression would still be gained of a part which was not moved under power. In any case, the advantageous safety aspects are fully retained.

To achieve constructive simplification, provision can be made for determining the force directly within the drive unit. This can involve, for example, a measurement of the strength of the current fed to the drive unit which is directly proportional to the turning moment generated by the drive unit. This bears a known relationship to the force exerted on the moveable part.

If the force exerted by the drive unit on the moveable is transmitted, for example, by a gear which drives a roller with a radius of r, where the roller drives the moveable part via a guided rope or toothed belt, the turning moment is calculated from the formula $$M=T.C.I$$

where I stands for the current passing to the drive unit, T for the reduction ratio of the gear and C for a machine constant. From this, the force exerted on the rope or the toothed belt and, consequently, the moveable part can be obtained from the known formula:

$$F=M/r$$

The determination of the force exerted on the moveable part by the drive unit can also be obtained via a mechanical force sensor or via a mechanical turning moment sensor. If the means of determining the force is provided by a current-measuring device this must not, of course, be located in the drive unit.

BRIEF DESCRIPTION OF THE DRAWINGS

Information about further advantages of and details relating to the invention can be obtained from the following description and figures. These show:

FIG. 7*c* shows the current strength passing to the drive unit and the speed of the moveable part in dependence on time; and FIGS. 8*a* and 8*b* are graphical representations of the speed of the moveable part in dependence upon time for a representative opening- and closing operation.

DETAILED DESCRIPTION OF THE INVENTION

Figure 1:
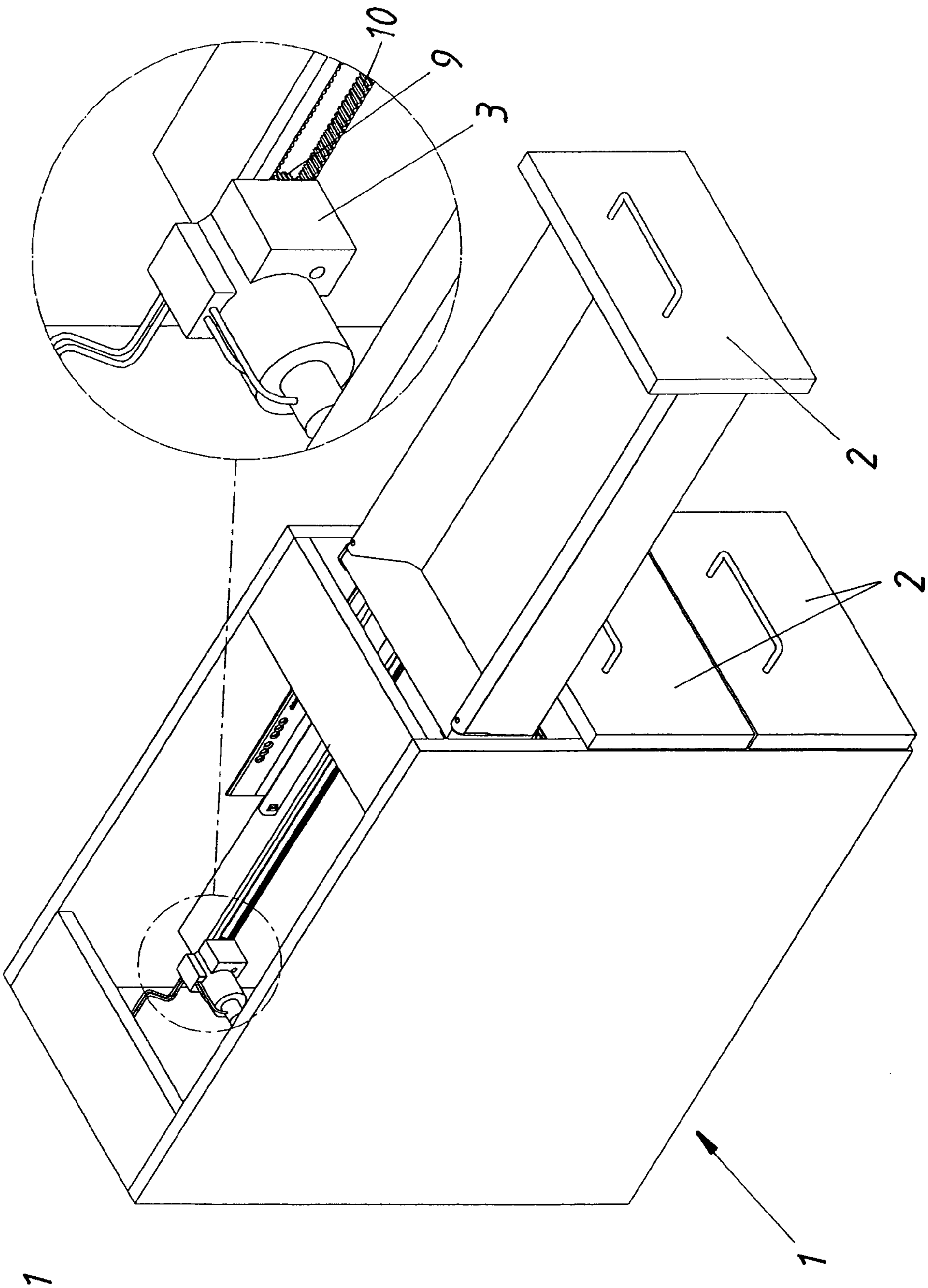
FIGS. 1 to 3 Embodiment example of articles of furniture, where the procedure in accordance with the invention is implemented in a variety of ways.

FIG. 1 displays in schematic form an item of furniture 1 with several moveable parts 2, where the upper moveable part 2 is depicted in a drawn-out position. A drive unit 3, which in this particular embodiment is an electric motor, is shown in the detailed representation together with a roller 9 over which passes a toothed belt 10. The drive unit 3 drives the roller 9 and, consequently, the toothed belt 10. By means of the toothed belt 10, the moveable part 2 is moved in a known manner. In the example depicted in FIG. 1 the drive unit 3 includes a measurement device (not shown) for the electric current to determine in accordance with the invention the force exerted on the moveable part 2 by the drive unit 3.

Figure 2:
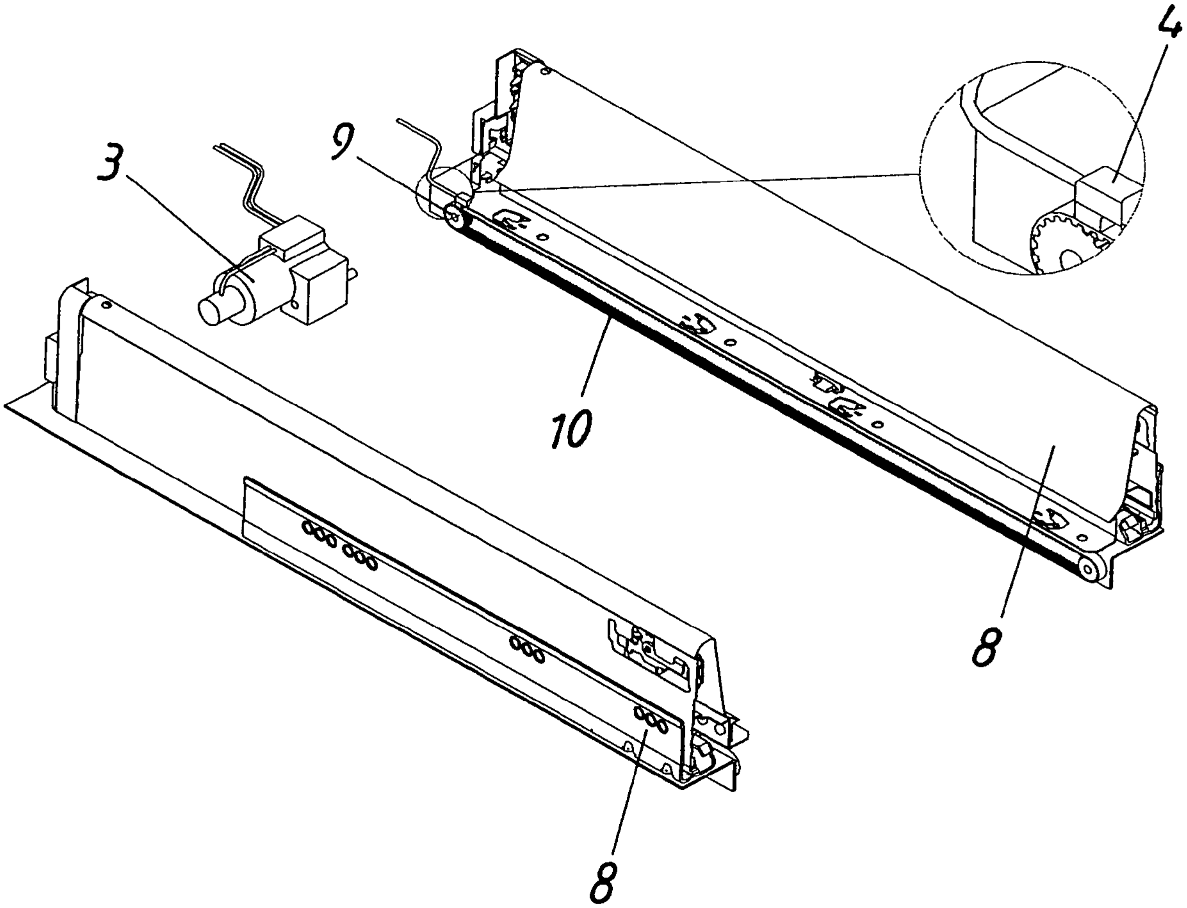

The embodiment example shown in FIG. 2 differs from that of FIG. 1 in that the determination of the force is not carried out by current measurement device integrated in the drive unit 3 but rather by a mechanical force sensor 4 which is in contact with the toothed belt 10. To avoid confusing detail, only the drive unit 3, the roller 9, the toothed belt 10, the carcass 8 and the mechanical force sensor 4 are illustrated. For the same reason, the drive unit 3 is depicted as being separated from the roller 9.

Figure 3:
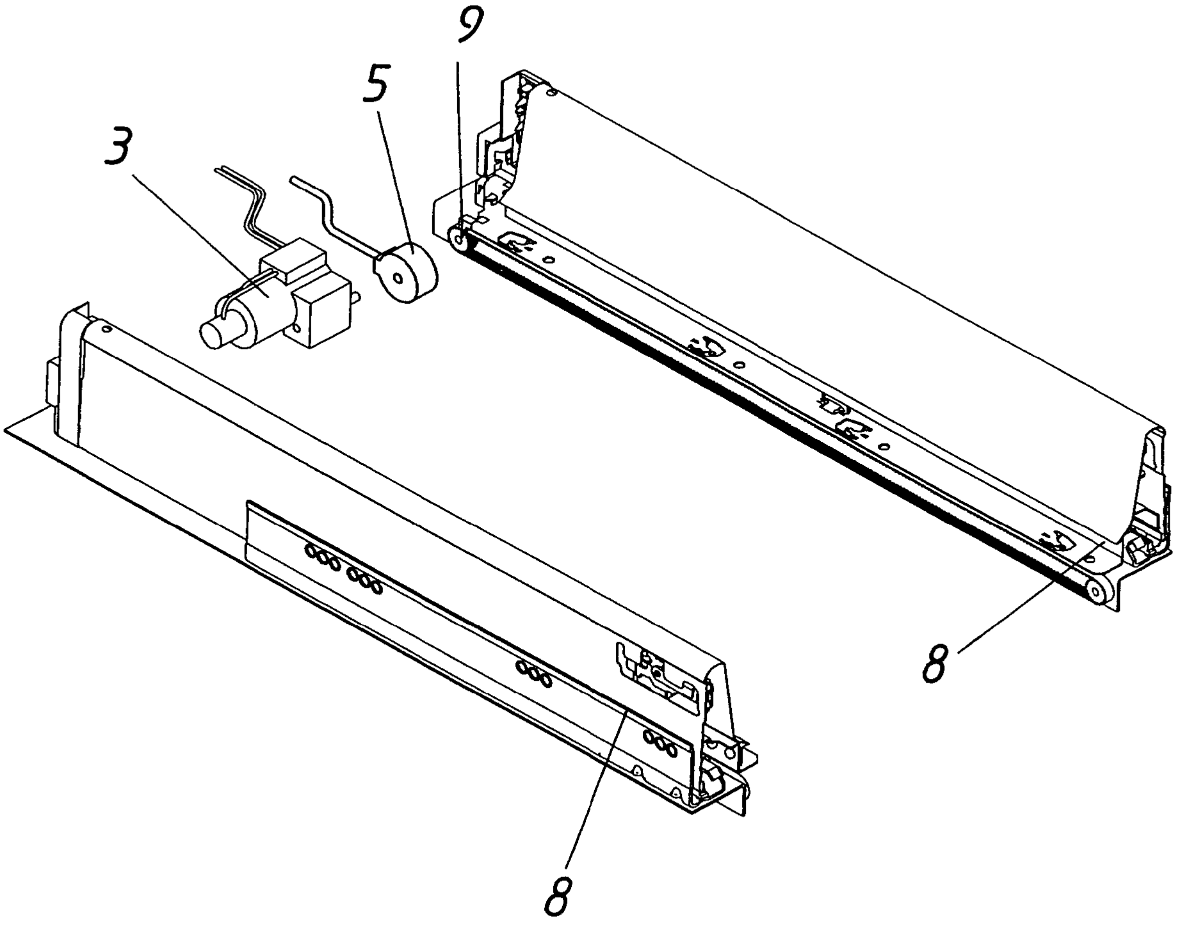

In the embodiment example illustrated in FIG. 3 a turning moment sensor is provided to determine the force. To avoid confusing detail, only the drive unit 3, the roller 9, the toothed belt 10, the carcass 8 and the mechanical force sensor 4 are illustrated. For the same reason, the drive unit 3 is depicted as being separated from the roller 9 and the turning moment sensor 5.

Figure 4A:
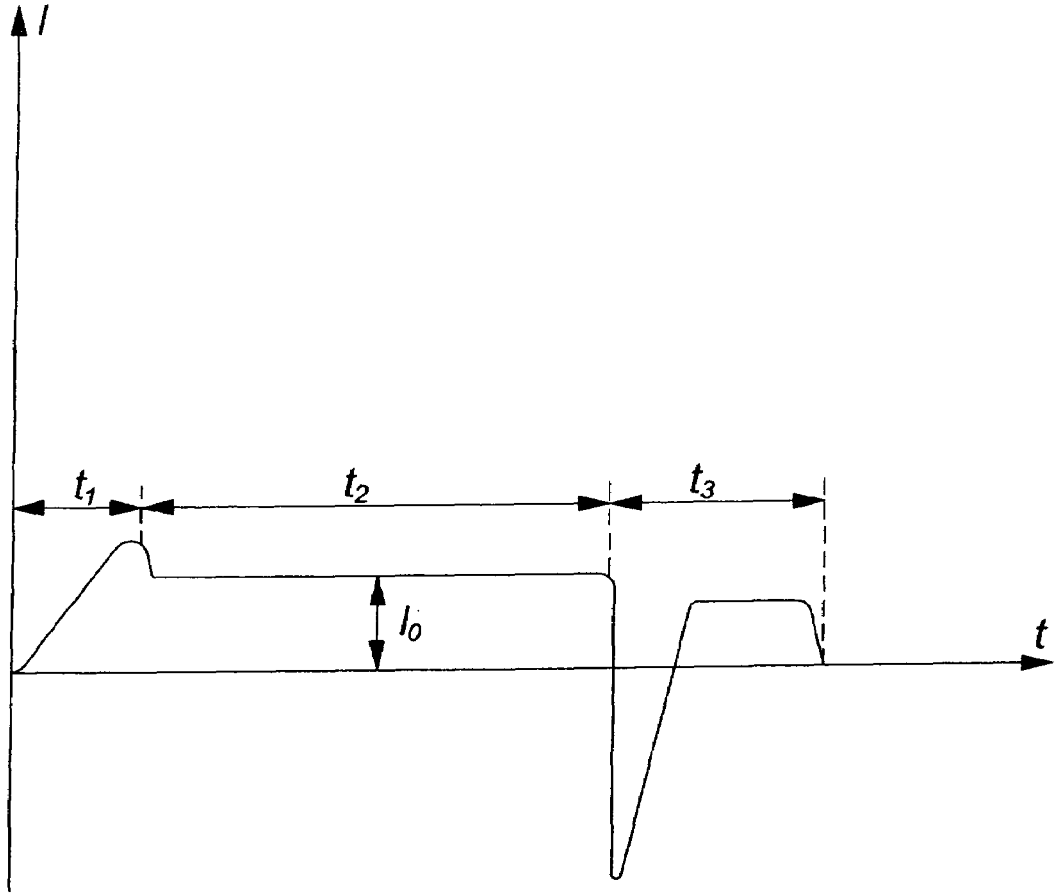
FIGS. 4*a* to 6*b* are graphs showing the current strength together with the speed of the moveable part in dependence upon time for different embodiments of the procedure in accordance with the invention.
Figure 4B:
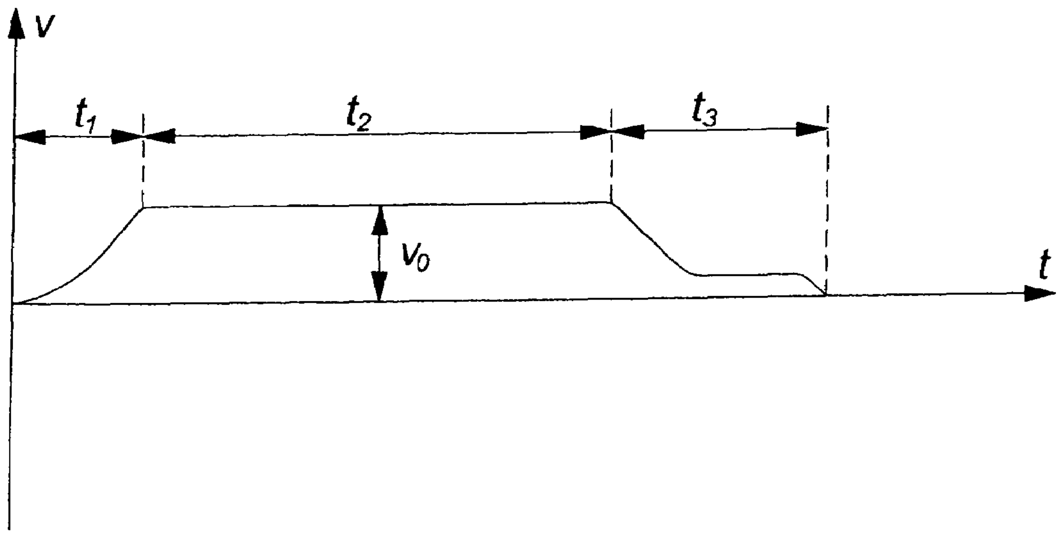

FIGS. 4*a* and 4*b* illustrate an example of the procedure in accordance with the invention for driving the moveable part 2 with respect to the current strength I fed to the drive unit 3 or the speed v of the moveable part 2 in dependence on the time spent t from the activation of the drive unit 3.

During an initial time $t_1$ in which the moveable part 2 traverses the partial length of track S ahead of the closed end position, an RPM-based adjustment is made to the drive unit to bring about an acceleration of the moveable part 2 away from the standing position. During time $t_1$, therefore, there is a rise in the strength of the current I being fed to the drive unit 2 which, as described in FIG. 4*b*, effects an increase in the speed of the moveable part 2.

After time $t_1$ has elapsed, the force exerted by the drive unit 3 upon the moveable part 2 is regulated to equal that of a predetermined value. In this embodiment example, this is effected by controlling the strength of the current I to the pre-determined value $I_0$ during the time $t_2$ in which the movable part 2 moves with a constant speed $v_0$ through the partial length of track S in the absence of a collision. At the same time, the current length I is controlled by predetermining the terminal voltage applied to the drive unit 3.

After the expiration of the time $t_2$, the moveable part 2 approaches its opened end-position which can, for example, be detected by sensors which are not illustrated.

To brake the moveable part 2, another RPM-based regulation of the drive unit 3 occurs during time $t_3$ as illustrated in FIG. 4*a*. This leads to the speed behaviour pattern illustrated in FIG. 4*b*. After the expiration of $t_1+t_2+t_3$ if no collision has occurred the moveable part 2 finds itself in its open end-position.

Figure 4C:
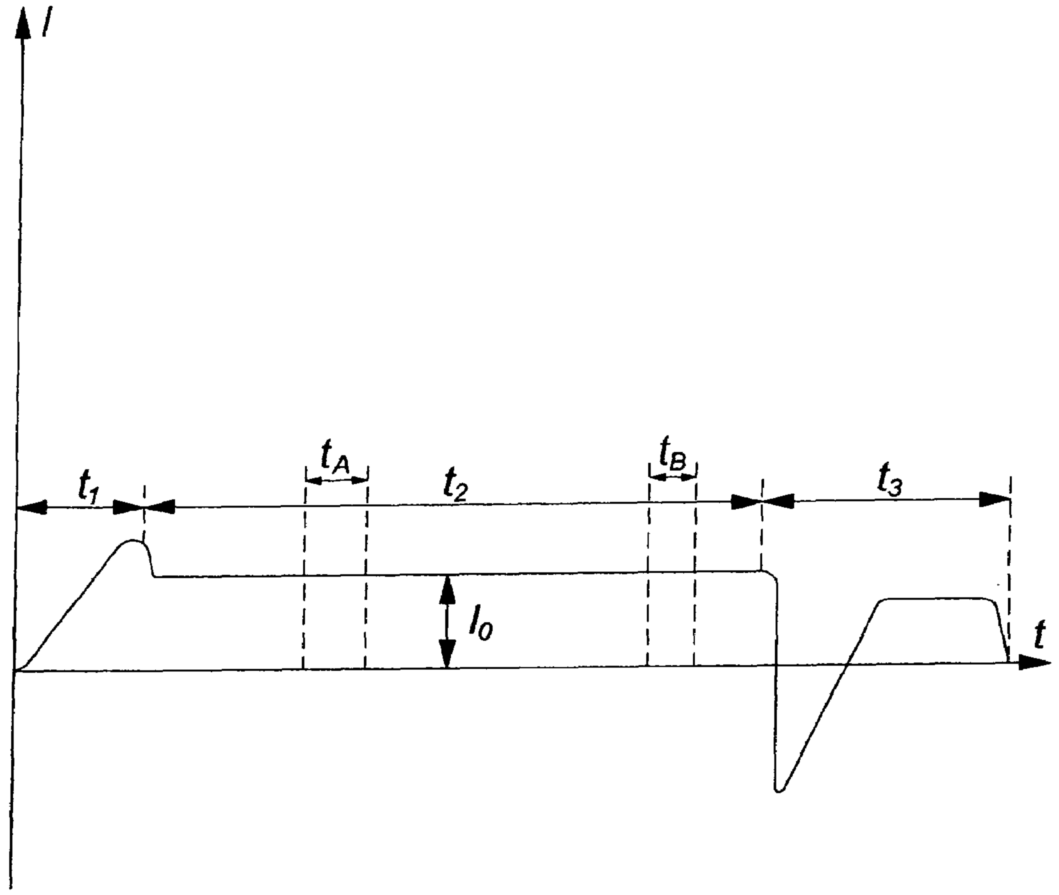
Figure 4D:
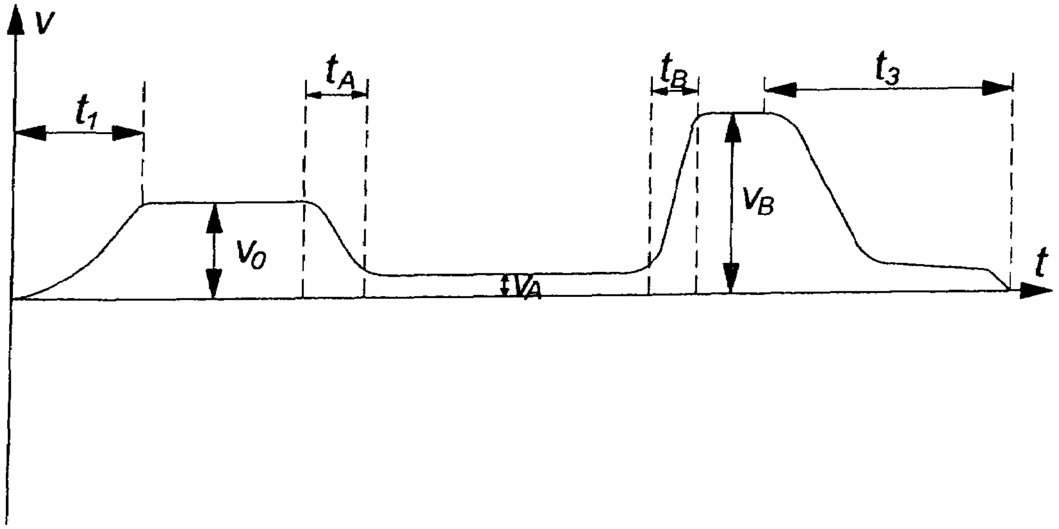

FIGS. 4*c* and 4*d* illustrate the example of FIGS. 4*a* and 4*b* with the difference that that during the time spans $t_A$ and $t_B$ there is a manual intervention by a user (not shown).

During the time span $t_A$ the user applies pressure to the moveable part 2 which causes the speed to sink from $V_0$ to a lower speed $V_A$. Since the drive unit 3 compensates the forces opposing the movement of the moveable parts, the moveable part 2 continues to move uniformly further but at this lower speed $V_A$.

During the time span $t_B$, the user pulls on the moveable part 2, whereby its speed $v_A$ is increased to a higher value of $v_B$. Since the drive unit 3 compensates the forces restricting the movement of the moveable part 2, the moveable part 2 moves uniformly further at this higher speed $v_B$.

Figure 5A:
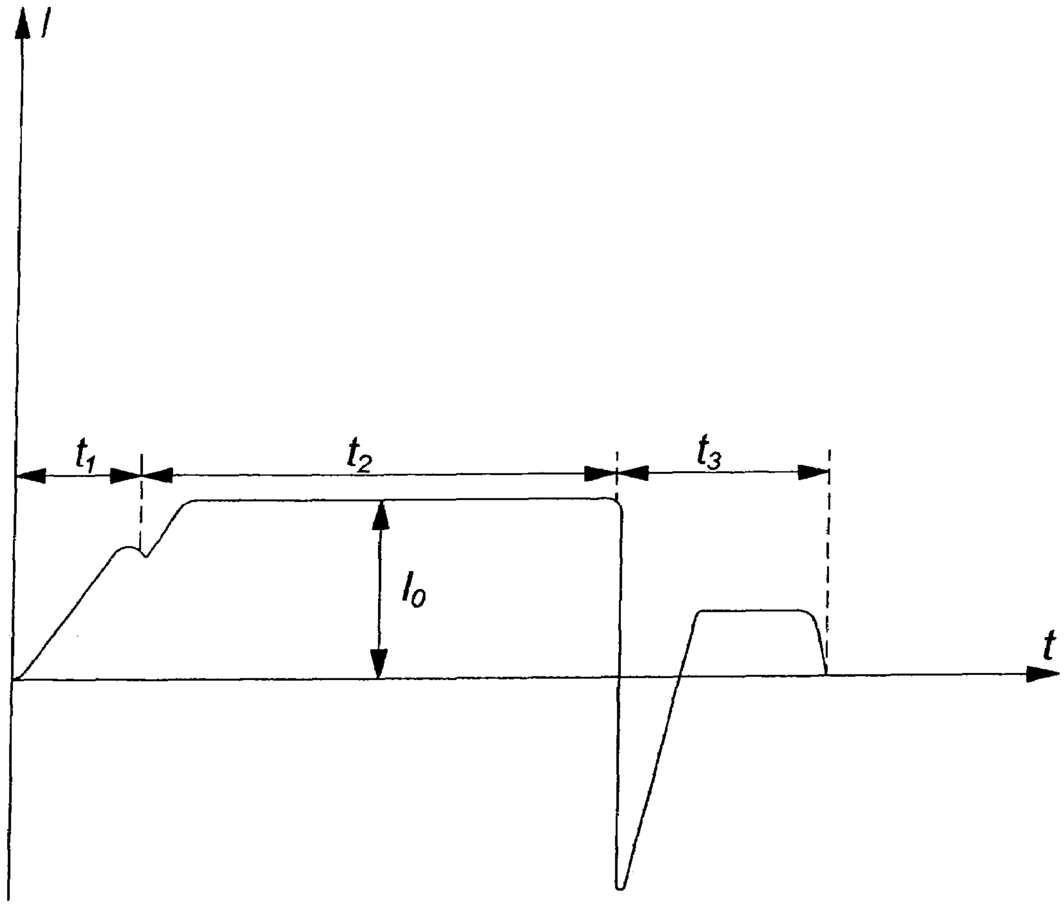
Figure 5B:
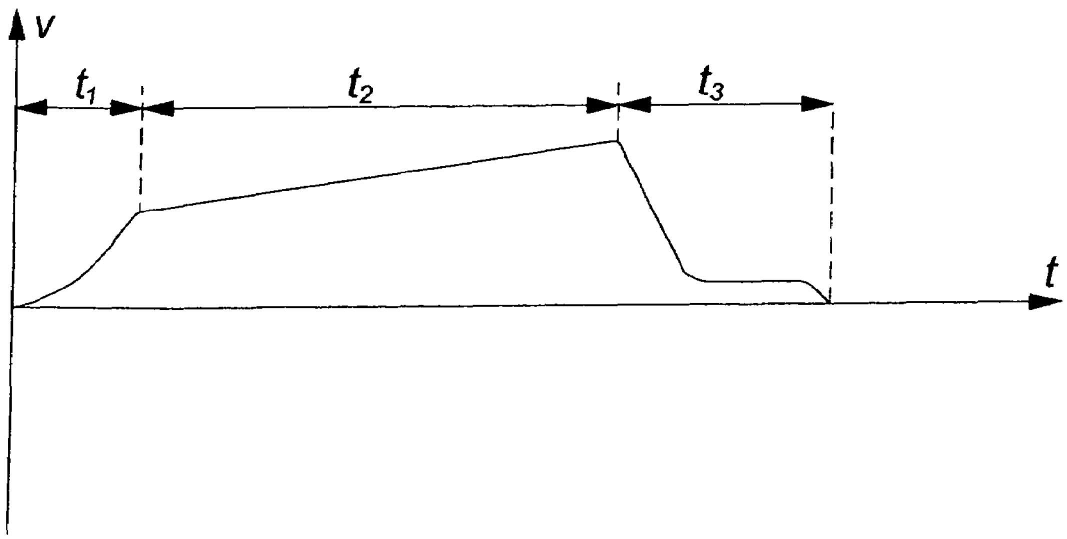

The FIGS. 5*a* and 5*b* illustrate a further example of the procedure in accordance with the invention which differs from that illustrated by FIGS. 4*a* and 4*b* in that a greater offset $I_o$ (i.e. a current strength $I_0$ which is not 0) is selected. In this way, the moveable part 2 experiences an acceleration during the time span $t_2$ during which interval it moves along the partial track $S_2$.

Figure 6A:
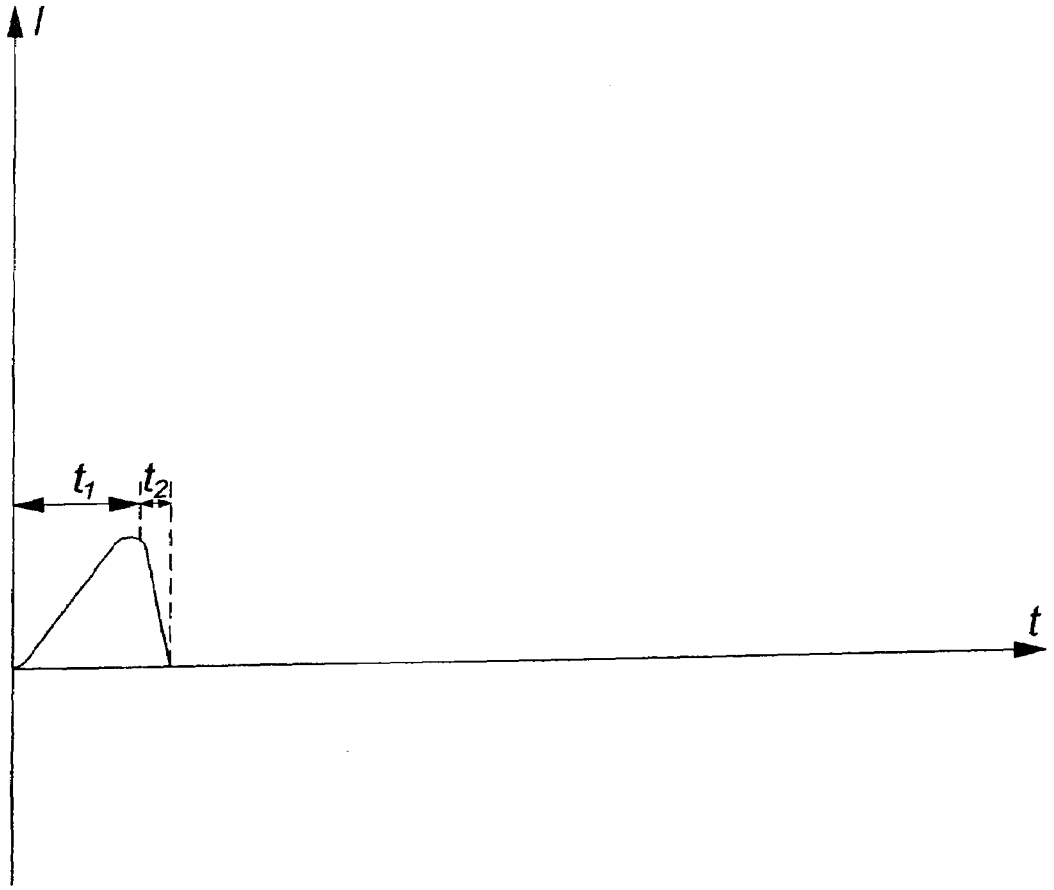
Figure 6B:
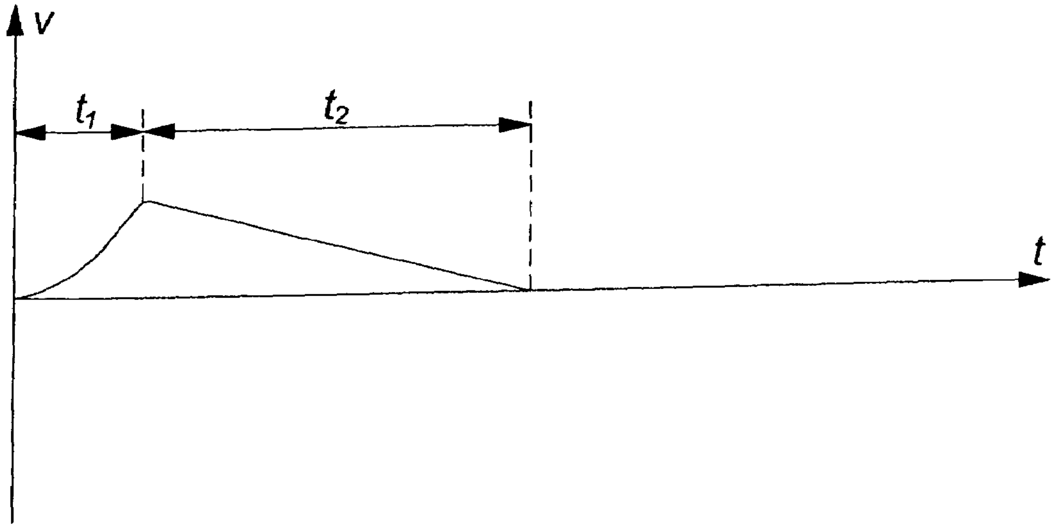

The examples of the invention illustrated in FIGS. 6*a* and 6*b* differ from the previous examples in that, after the first time span $t_1$, the strength of the current I is adjusted to the value 0 so that force exerted on the moveable part 2 by the drive unit 3 becomes 0 N. While this is happening, the drive unit 3 remains active. As is shown in FIG. 6*b*, during the time span $t_2$ the moveable part 2 runs under the influence of the friction forces and remains in a position between the closed and open end-locations.

FIGS. 7*a* to 7*d* illustrate an example of the procedure in accordance with the invention in the event of a collision between the moveable part 2 and an object 7.

Figure 7A:
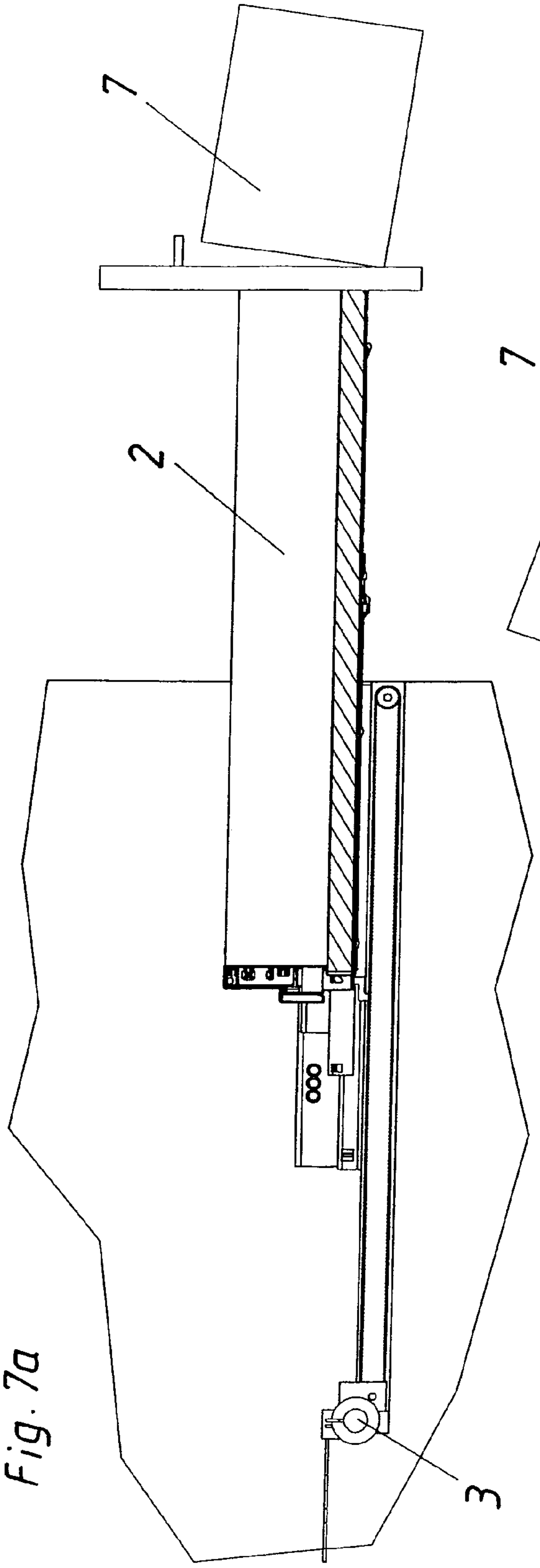
FIGS. 7*a* to *d* are schematic representations of a collision between the moveable part and an object together.
Figure 7B:
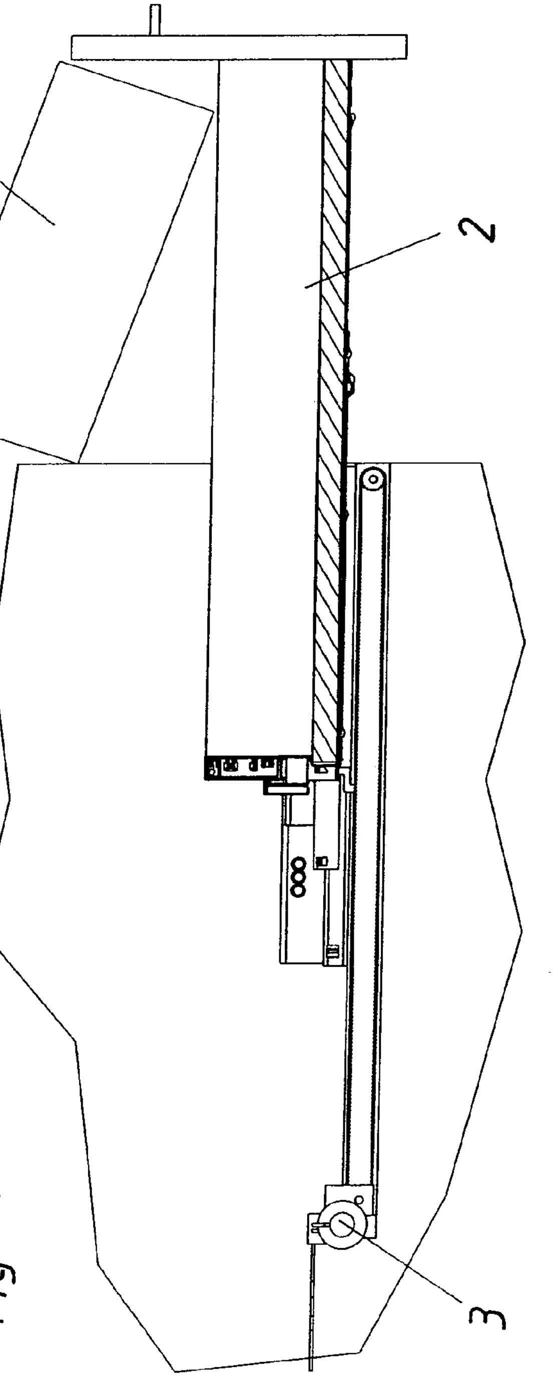
Figure 7C:
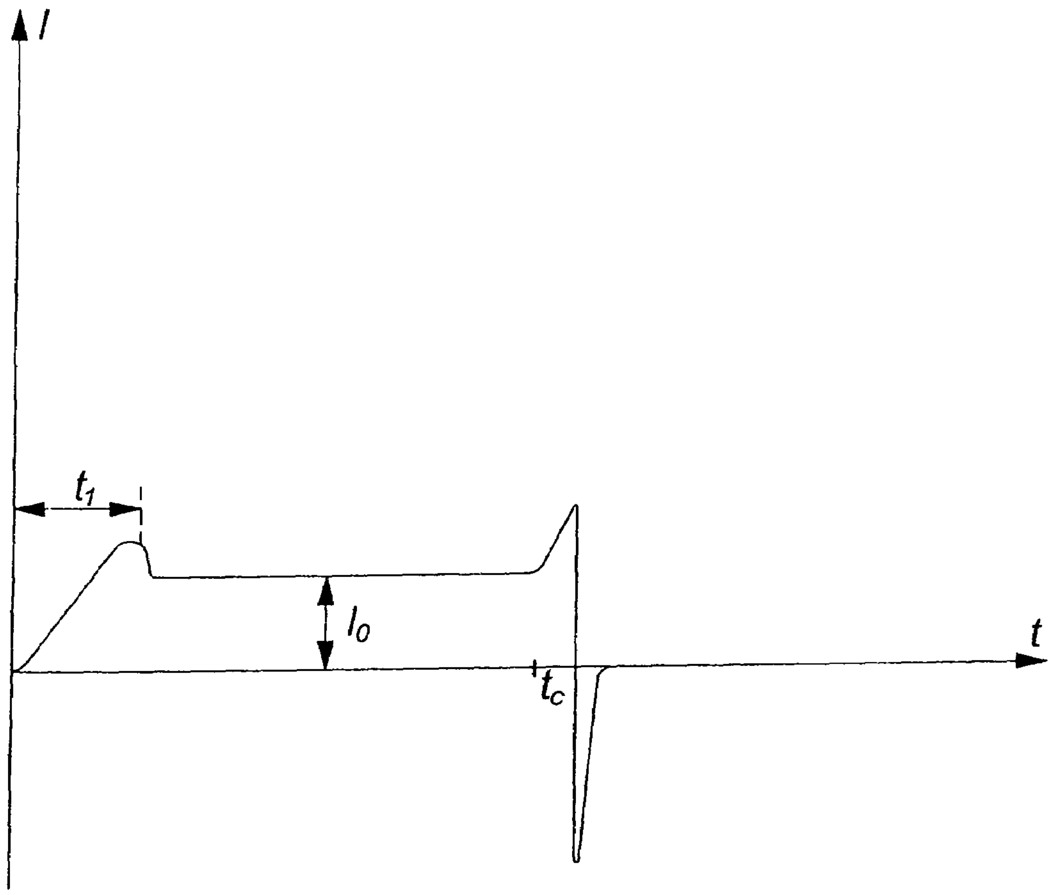
Figure 7D:
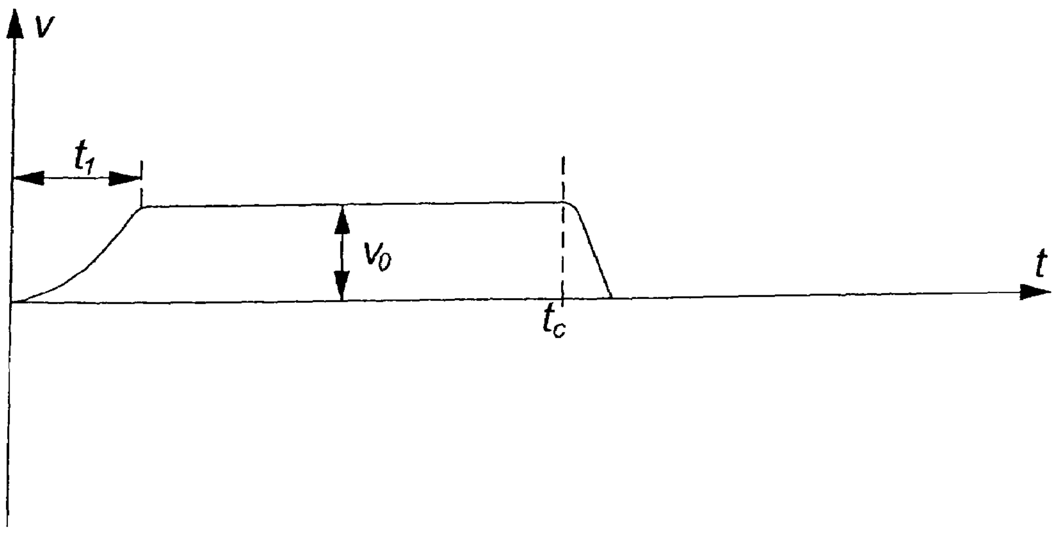

As is shown in FIG. 7*c*, the current strength I at the end of the time span $t_1$ during which the RPM-control takes place is adjusted to the value $I_o$ as a result of which the moveable part 2 retains a constant speed $v_o$ (FIG. 7*d*). At time $t_o$ there occurs the collision represented in FIG. 7*a* or FIG. 7*b* of the moveable part 2 with the schematically indicated object 7, which as depicted in FIG. 7*c* brings about a momentary increase in the current strength I of a value $I_o$. The extent and the duration of that increase is strongly exaggerated in the diagram. The current strength I is then controlled down again by reducing the terminal voltage associated with the drive unit 3. In so doing the terminal voltage falls below a pre-determined value which is recognized as indicative of a collision. Reacting to this, the braking action on the moveable part 2 is immediately effected by the drive unit 3 so that any damage resulting from the collision is reduced to a minimum. This is achieved by a known reversal of the polarity of the terminal voltage.

FIG. 8*a* illustrates by way of example an opening operation.

In the time between $t_o$ and $t_1$ an RPM-controlled acceleration takes place. At the time $t_o$, the value $v_o$ of the speed generated by the force applied by the user to the moveable part 2 is measured. In this embodiment example, a value of $a_o$=1.5 m/sec$^2$ is allocated to the acceleration $a_o$. The movable part 2 continues to accelerate until the value $v_1$ of the minimum speed (in this instance $v_1$=0.12 m/sec) is reached at time $t_1$.

If this minimum speed is attained, the motor current is measured and switched to the control of current strength (which corresponds to the turning moment M). The measured value of the current strength I serves as the nominal value $I_c$ for controlling the current.

If during this transit sequence the friction values change (for example, by load-dependent reductions or track-dependent control and locking units of the guidance system of the movable part 2) the moveable part 2 is accelerated or retarded at constant motor turning moment M.

In order that the moveable part 2 does not travel too quickly or too slowly because of friction changes, monitoring takes place to detect both a minimal speed $v_{12.min}$ and a maximal speed $v_{12.max}$ (in this instance, $v_{12.min}$=0.2 m/sec, $v_{12.max}$ and $v_{12.max}$=0.25 m/sec). If either limiting value is exceeded the nominal value $I_o$ of the motor current I is incrementally lowered or raised (for example, by delta I=15.6 mA every 2 ms) until a speed is attained which lies between the limiting values.

The current increment ΔI then amounts to delta I=15.6 mA. This corresponds to a power differential delta F of delta F=0.4N. The maximal value of the current strength $I_{12.max}$ and the associated power =$F_{12.max}$ amount to $I_{12.max}$=530 mA and $_{F12.max}$=14 N. The minimal values amount to $I_{12.min}$=340 mA and $F_{12.min}$=8N.

It at time $t_2$ the moveable part 2 reaches a predetermined distance delta s from the end stop, the speed $v_2$ is measured and the appropriate retardation $a_2$ is determined by the formula $a_2$=$v^2{}_2$/delta ($s_2$) to ensure that the moveable part 2 safely comes to rest before reaching the end stop.

For example, a delta S can equal 130 mm. Following the calculation of $a_2$ the RPM is controlled by regulating the current strength I (the nominal value of the speed is correspondingly reduced with the deceleration).

If the minimal speed $v_s$ is reached by time $t_2$, the moveable part 2 moves with this speed (in this instance $v_s$=0.065 m/sec) until reaching the end stop.

FIG. 8*b* shows a closing procedure analogous to that of FIG. 8*a*. For safety reasons, the speeds are somewhat lower and a longer braking path is selected.

At time $t_o$ the speed $v_o$ is measured. The acceleration $a_o$=1.4 m/sec$^2$. The speed $va_1$=0.68 m/sec.

At time $t_1$, the minimal value for the speed $v_{12.min}$ is selected to be 0.12 m/sec and for the maximal value of the speed $v_{12.max}$ to be 0.125 m/s.

The current strength increment delta I thereby amounts to 15.6 mA. This corresponds to a force differential where delta F=0.4 N. The maximal permissible current strength $I_{12.max}$ and the corresponding maximal permissible force $F_{12.max}$ on the moveable part 2 amount to $I_{12.max}$=690 mA and $F_{12.max}$=18 N. The minimal values amount to $_{12.min}$=330 mA and $F_{12}$=9 N.

At time $t_2$ (delta s=160 mm) the speed $v_2$ is measured and from this the retardation $a_2$ is calculated.

From time $t_3$ the speed $v_3$ amounts to 0.065 m/s until time $t_4$ when the end stop is reached.

The invention claimed is:

1. A method of driving a moveable part of an article of furniture which includes a track that can be traversed by the moveable part, the method comprising:

providing a drive unit that is capable of applying a driving force to the moveable part over at least a part of the total length of the track, wherein the driving force can be regulated as a function of time from activation of the drive unit, speed of the movable part, current or voltage fed to the drive unit, force opposing movement of the movable part, or distance traveled by the moveable part; and controlling the driving force applied by the drive unit, over at least a part of the total length of the track, so that the driving force applied by the drive unit on the moveable part is closed-loop controlled at a predetermined force unit.

2. The method as claimed in claim 1, wherein the force applied by the drive unit is controlled such that the predetermined force value is zero Newton.

3. The method as claimed in claim 1, wherein the force applied by the drive unit is controlled so that the predetermined force value effects a constant speed for the moveable part.

4. The method as claimed in claim 1, wherein the force applied by the drive unit is controlled such that the predetermined force value an acceleration of the moveable part.

5. The method as claimed in claim 1, wherein the drive unit is RPM controlled so that the moveable part is driven over at least a partial length of the total length of the track to be traversed by the moveable part.

6. The method as claimed in claim 5, wherein the moveable part is a drawer, and the drawer is arranged to move between a fully closed position and a fully open position, and the drive unit is driven in an RPM-controlled manner to drive the drawer over a partial length of the track located before the fully closed position and/or over a partial length of the track located before the fully open position.

7. The method of claim in claim 1, further comprising determining the value of the force exerted on the moveable part by the driving unit at which the speed of the moveable part remains constant.

8. The method as claimed in claim 7, wherein the determination of the force takes place directly in the drive unit.

9. The method as claimed in claim 7, wherein the force is determined by means of a mechanical force sensor.

10. The method as claimed in claim 7, wherein the magnitude of the force is determined by a mechanical turning moment sensor.

11. The method as claimed in claim 7, wherein the magnitude of the force is determined by a current measurement device.

12. The method as claimed in claim 7, wherein the drive unit is an electrical drive unit.

13. A method of driving a drawer of an item of furniture having a track along with the drawer is moveable, the method comprising:

providing a drive unit that is capable of applying a driving force to the moveable drawer over at least part of the total length of the track to be traversed by the moveable drawer, wherein the driving force can be regulated as a function of time from activation of the drive unit, speed of the drawer, current or voltage fed to the drive unit, force opposing movement of the drawer, or distance traveled by the drawer; and controlling the driving force applied by the driving unit so that the driving force is closed-loop controlled at a predetermined force value.

* * * * *